Patented Aug. 31, 1954

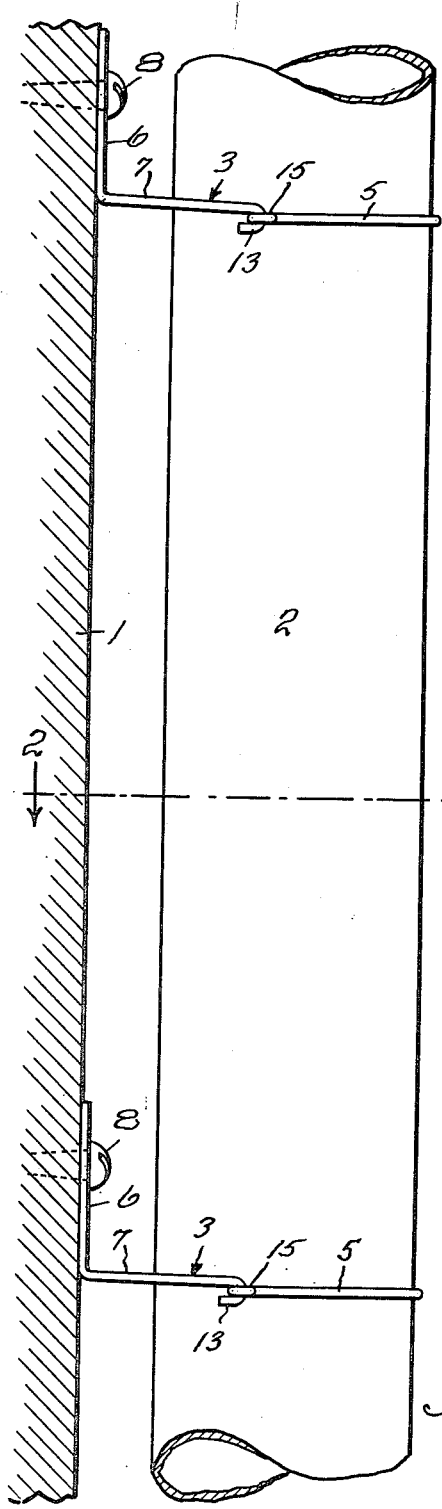
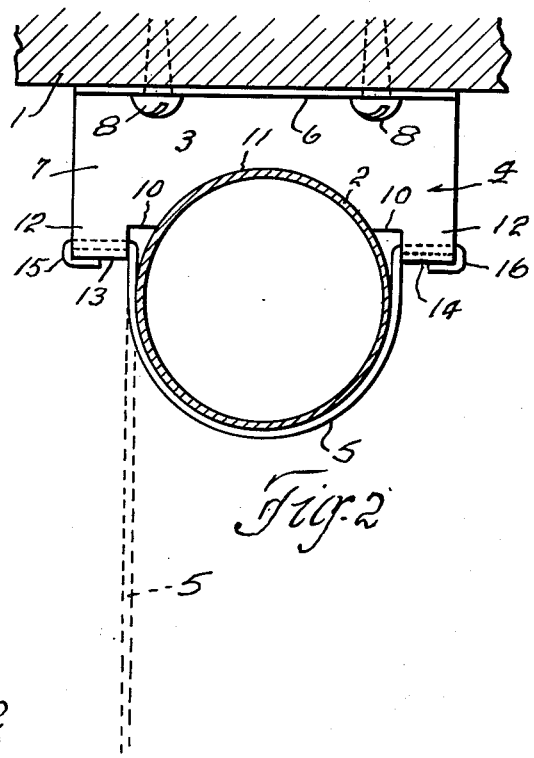
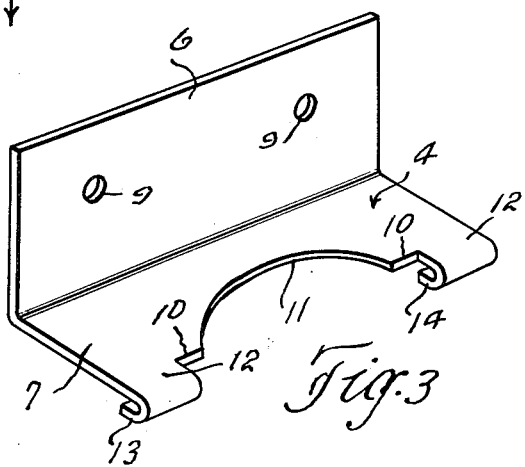

2,687,864

UNITED STATES PATENT OFFICE 2,687,864

PIPE HANGER

Blake H. Kohler, Mansfield, Ohio

Application February 27, 1950, Serial No. 146,460

1 Claim. (Cl. 248—74)

This invention relates generally to pipe hangers by which pipes or conduits are attached to the wall of buildings or other supporting structures. The invention is particularly adapted for securing down-spouts to the walls of buildings, but can be used equally well for holding various other types of pipes or conduits in place.

The principal object of the invention is to provide a very simple, efficient and inexpensive pipe hanger which can be quickly and easily secured in place.

Another object of the invention is to provide a pipe hanger which is so constructed and arranged that pipes or conduits can be quickly and easily secured thereto and removed therefrom.

Another object of the invention is to provide a hanger which will support a down-spout a fixed distance from the wall of a building so as to permit the convenient painting of both the down-spout and the wall of the building, and prevent the accumulation of dust, dirt and dampness behind the down-spout.

Other and more limited objects of the invention will be apparent from the following specification and the accompanying drawings forming a part thereof wherein:

Fig. 1 is a view in side elevation showing a section of down-spout secured to the wall of a building by my improved hanger;

Fig. 2 is a horizontal section taken on the line 2—2 of Fig. 1; and

Fig. 3 is a perspective view of my new and improved hanger.

Referring now to the drawings by reference characters, the numeral 1 indicates a wall of a building, the numeral 2 a section of down-spouting, and the numeral 3 indicates generally my improved hanger by which the down-spout 2 is held in position a fixed distance from the wall 1. In use the hangers 3 are disposed at fixed intervals, the distance between the hangers being dependent upon the nature of the pipe or conduit being supported thereby.

The hanger 3 comprises a rigid angular sheet metal bracket 4 and a flexible binding wire 5. The bracket 4 is formed from a single piece of sheet metal and comprises a base 6 and an angular extension 7 extending outwardly from one end of the base 6. The base 6 is adapted to be secured to a wall 1 or other structure by screws or nails 8 which pass through apertures 9 in the base 6. The forward edge 10 of the extension 7 has a centrally disposed arcuate recess 11 formed therein. The radius of the arcuate recess 11 is the same as the outside radius of the pipe to be supported by the hanger. Different size brackets are provided for different standard sizes of pipes or spouting. In case the hanger is to be used with other than circular pipes or conduits the contour of the recess 11 is made to conform to the cross sectional contour of the pipe or conduit being supported. The extension 7 has a pair of tongues 12 formed integrally therewith and extending forwardly from the edge 10, one at each side of the recess 11. The tongues 12 are bent downwardly and then rearwardly to form hooks 13 and 14. The distance between the opposing edges of the tongues 12 is preferably slightly greater than the diameter of the pipe being supported. In use the supported pipe is seated in the recess 11 and is held therein by the binding wire 5 which is secured to and extends between the hooks 13 and 14 and around the pipe opposite the recess 11. The ends of the wire 5 are bent to form hooks 15 and 16 which engage the hooks 13 and 14, as shown in Figs. 1 and 2, to hold the wire 5 in place tightly engaging the supported pipe.

When installing pipes or conduits with my improved hanger the brackets 4 are first secured to the wall 1 or other structure in spaced aligned relation by the screws or nails 8. One end of each of the binding wires 5 is then bent to form the hooks 15 after which the wires are inserted in the hooks 13 and bent to the position shown in dotted lines in Fig. 2. The pipe or conduit is then seated in the recesses 11 after which the wires 5 are bent tightly around the pipe or conduit and into the hook 14. The free end of the binding wire 5 is then bent to form the hook 16 which engages the hook 14 and holds the wire 5 securely in place. In order to remove a pipe or conduit from a hanger for replacement or repair it is only necessary to straighten out one of the hooks 15 or 16 with a pair of pliers and remove the wire 5.

From the foregoing it will be apparent that I have provided a very simple and efficient structure for accomplishing the objects of my invention.

It is to be understood that I am not limited to the specific construction shown and described as various modifications may be made thereto within the spirit of the invention.

What is claimed is:

A hanger for supporting a down-spout a fixed distance from a wall comprising a bracket formed from a single piece of sheet metal and having a vertical arm adapted to be permanently secured to a fixed supporting member and a substantially horizontal arm extending outwardly from the lower end of said vertical arm, the angle between said vertical arm and said horizontal arm being not less than 90°, a recess in the forward edge of said horizontal arm in which a down-spout is adapted to be removably seated, the forward edge on each side of said recess being bent downwardly and rearwardly to form a pair of rearwardly open hooks, and a single piece of flexible wire by which a down-spout is firmly clamped in said recess, one end of said flexible wire being adapted to be removably secured to one of said hooks and the other end of said flexible wire being adapted to be removably secured to the other of said hooks.

References Cited in the file of this patent

UNITED STATES PATENTS

| Number | Name | Date |
|---|---|---|
| 163,531 | Roake | May 18, 1875 |
| 240,736 | Leeds | Apr. 26, 1881 |
| 347,685 | Card | Aug. 17, 1886 |
| 451,715 | Rockhill | May 5, 1891 |
| 928,711 | Taft | July 20, 1909 |
| 1,335,369 | Donohue | Mar. 30, 1920 |
| 1,681,552 | Mount et al. | Aug. 21, 1928 |
| 2,049,593 | Schabinger | Aug. 4, 1936 |
| 2,251,512 | Bush et al. | Aug. 5, 1941 |
| 2,353,363 | Sanford | July 11, 1944 |
| 2,547,813 | Coons et al. | Apr. 3, 1951 |

FOREIGN PATENTS

| Number | Country | Date |
|---|---|---|
| 41,601 | France | Feb. 15, 1933 |

(1st addition to No. 736,735)